April 29, 1947.         H. G. BUSIGNIES         2,419,671
DIRECTION FINDING SYSTEM
Filed Feb. 26, 1942
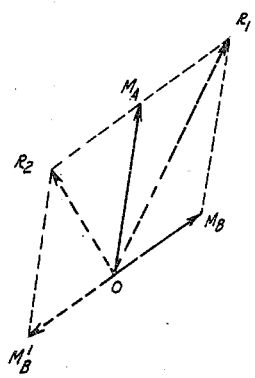
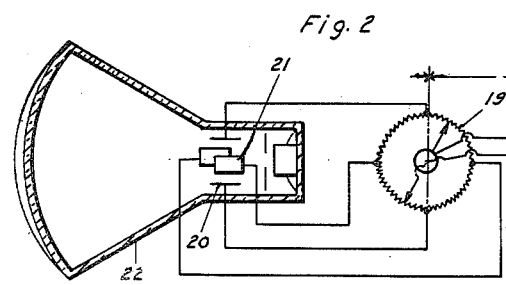
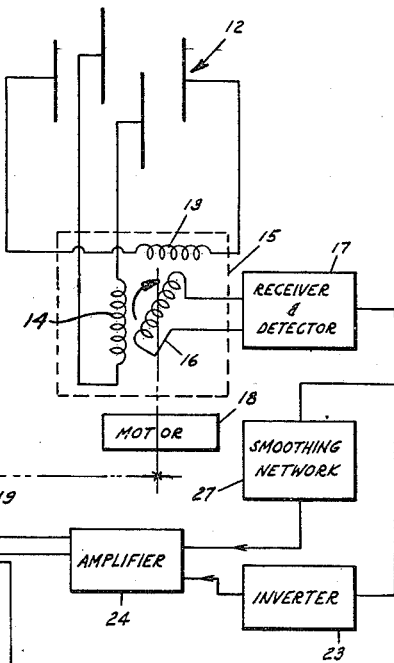
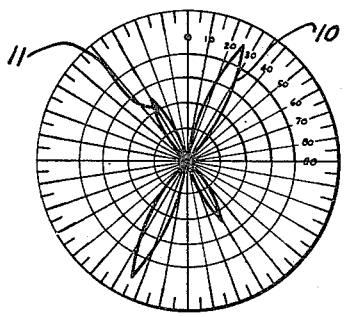
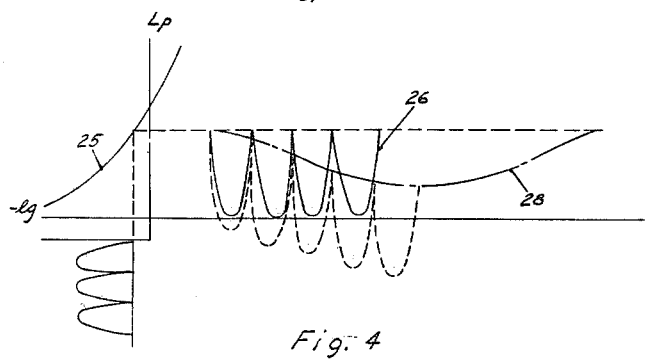
INVENTOR.
HENRI G. BUSIGNIES
BY
Paul R. Adams
ATTORNEY Patented Apr. 29, 1947

2,419,671

UNITED STATES PATENT OFFICE 2,419,671

DIRECTION FINDING SYSTEM

Henri G. Busignies, Forest Hills, N. Y., assignor to Federal Telephone and Radio Corporation, a corporation of Delaware Application February 26, 1942, Serial No. 432,423

6 Claims. (Cl. 250—11)

This invention relates to improvements in direction-finding methods and apparatus, and more particularly to a method for eliminating the effect of so-called night and/or mountain error. These particular effects have been studied and discussed in some detail in a paper presented by me before the Institute of Radio Engineers, June 27, 1939, and published in the Electrical Communication, vol. 19, November 3, 1941.

As disclosed in the above-mentioned paper, during the day-time in flight over relatively flat country or water, radio waves propagated from a transmitting station and employed for direction finding purposes are characterized substantially entirely by the directly propagated signal. Under these conditions, relatively simple and known methods may be employed for determining the true direction of the station and for flying a desired steady course with respect thereto.

However, at night, or in the presence of mountainous regions, these directly propagated waves may not be the only signals received. Under such conditions, either a portion of an ionosphere layer or mountains, as the case may be, may provide a highly effective reflecting surface so that strong reflections of the directly propagated wave may also be detected by the direction finding apparatus, that is, in addition to the directly propagated wave.

As clearly pointed out in the above paper, erroneous directional indications resulting from interference of the direct and reflected waves, may be very considerable and hitherto have proven to be a source of substantial danger to pilots.

It is accordingly a primary objective of this invention to provide a method of direction finding in spite of the degree of night and/or mountain error present.

Another object is to provide relatively simple apparatus to enable the pilot to proceed with such a method.

It is also an object to provide means whereby the direction of each of a plurality of transmitting stations broadcasting synchronously on the same carrier may be distinguished one from another.

A further object is to provide a method and means for reducing or avoiding undesired effects of reflecting bodies such as aircraft hangars, parts of ships, etc., especially on ultra short waves.

Other objects and various further features of novelty and invention will hereinafter be pointed out or will occur to those skilled in the art from a reading of the following specification in conjunction with the drawings included herewith. In said drawings:

Fig. 1 is a vector diagram illustrating graphically a typical problem this invention seeks to solve;

Fig. 2 is a schematic block diagram illustrative of one embodiment of the invention;

Fig. 3 represents a reading as obtained with the apparatus of Fig. 2;

Fig. 4 is a graphic illustration of voltage and current phenomena in the circuit of Fig. 2; and Fig. 5 represents further apparatus in accordance with the invention which may be used with or without that shown in Fig. 2.

It was observed in the above-mentioned publication that the error which this invention seeks to eliminate is caused by the instantaneous resultant of two vectors, one of which represents a component indicative of the true direction and the other of which fluctuates periodically with flight and is due to the reflected wave. In flight, this error is observed by a periodic oscillation of observed direction, such oscillation being between two limits which are observed to be very clear. Between these two limits, a confused direction indication has been noted. It is proposed in accordance with the invention that the true direction be determined from a determination of the magnitude and direction of the received resultant signals characterizing each of the two above-mentioned erroneous limits of direction oscillation.

Referring to the graphical representation in Fig. 1 for an illustration of the source of the above-noted errors, the vector $M_A$ represents the magnitude and direction of the magnetic vector component of directly propagated waves and the vector $M_B$ represents the instantaneous magnitude and direction of the magnetic vector component of the reflected signal. It has been observed in flight that at progressive distances, the vector $M_B$ (in the plane of maximum response of the antenna apparatus carried by the airplane) rotates through 360° with respect to $M_A$ and therefore oscillates from a limit as shown to another limit 180° out of phase (indicated by the dotted vector $M_B'$) and back again to $M_B$ to repeat the cycle. At any one instant of time, therefore, the magnitude of the signal received and detected by the direction finding apparatus on the aircraft will be proportional to a vectorial summation of vector $M_A$ and vector $M_B$ whatever that may be. Considering the two extreme positions of the vector due to the reflected signal, representing the maximum components of the magnetic vector component of the reflected signal in the plane of maximum sensitivity of the antenna structure, it will be observed that two extreme resultant readings $R_1$ and $R_2$ will be alternately obtained, depending upon the alternate presence of the vector $M_B$ or the vector $M_B'$.

In order to enable a pilot to determine true direction of the directly propagated wave in the presence of the above noted error, I propose in accordance with the invention, that the pilot first ascertain the magnitude and direction of the respective resultants $R_1$ and $R_2$ and then construct either in his mind or with the aid of a simple calculating device an appropriate vector diagram similar to that of Fig. 1. True direction is thus known from the direction of the vector $M_A$ by considering this vector as a median of the triangle $R_1OR_2$ drawn from the origin O of all vectors to the opposite side $R_1R_2$, as will be clear from an examination of the geometrical construction of the diagram of Fig. 1.

In accordance with the invention, I propose the use of a relatively simple indicating device employing a cathode ray tube alternately to show the magnitude and direction of the resultant vectors $R_1$ and $R_2$. Such indications may be of the nature shown in Fig. 3 and resembling for each resultant a relatively narrow, pointed, propeller-like configuration, such as indication 10 for the resultant $R_1$, and indication 11 for the resultant $R_2$.

Apparatus for obtaining these similar, narrow, pointed indications on the screen of a cathode ray device may comprise a two-phase resistance distributor as shown. This distributor arrangement is simply a means for supplying any voltage wave form as two-phase energy having an envelope corresponding to the wave form, and it is clearly suitable for simultaneously effectively applying a rotating sweep field to the oscillograph deflection systems and for varying the radial magnitude of the sweep in accordance with the envelope.

Suitable apparatus for obtaining the configurations shown on the screen of Fig. 3 is disclosed schematically in Fig. 2. In the form shown, a directional antenna 12 of the Adcock type may be employed and connected so that the opposite elements thereof supply received energy to stator coils 13 and 14 of a goniometric device 15. Goniometer 15 includes further a search coil 16 which may be rotated at a relatively low frequency and, in this manner, supply received energy to a receiver and detector network 17 of known form. Network 17 preferably includes means for detecting the envelope of the received signal, that is, for substantially eliminating the carrier and for full-wave rectifying said envelope. Rotation of search coil 16 serves to rotate the effective directional response of antenna 12 in synchronism therewith. In the form shown, search coil 16 is rotated continuously by a motor 18.

It will be clear that the output of receiver detector 17 may be a series of regularly spaced U-shaped fluctuations characterized by sharp cusp-shaped minima, representing zero signal, there being two such minima for each rotation of coil 16 corresponding to the two opposing positions of minimum received signal. Now, with a distributing arrangement such as the device 19, these minima may be employed to supply deflection potentials defining the outermost portion of the observed indications 10 or 11 in Fig. 3. Accordingly, received and detected energy is supplied to resistance generator 19 which may furnish such detected energy in two-phase form for appropriate application to the respective deflection systems 20, 21 of a cathode ray indicator tube 22.

As above noted, I prefer that the cusp-shaped minima of the detected signal characterize the outermost portions of the indications appearing on the screen of the cathode ray tube 22. It is accordingly necessary that deflection for the remainder of the detected signals be radially inward and extend, say, to the center as shown in Fig. 3. To obtain such potentials, the detected signal must be inverted as by an inverter 23 whereby the cusp-shaped portions of the detected signal are applied to deflection systems 20 and 21 as maximum voltages. In the form shown, in order to obtain adequate radially inward deflection of the cathode ray, I provide an amplifier stage 24, intermediate inverter 23 and resistance distributor 19. Considering the curve 25 of Fig. 4 to represent the characteristic curve of amplifier 24, the type of signal supplied to resistance distributor 19 may be as shown in solid lines in Fig. 4 and indicated by the reference 26.

In accordance with the invention, the instantaneous magnitude of one of the indications 10 or 11 may be depicted on the screen of the cathode ray device 22 by supplying an appropriate bias-control potential to amplifier device 24, such bias signal being proportional to the average magnitude of the detected signal. In the form shown, such a control signal is generated by a smoothing network 27 which may be similar to an automatic volume control circuit having its input connected to the output of detector 17 and supplying a varying bias signal to the grid of amplifier 24. Preferably, the polarity of the signal generated by network 27 is such that the larger the output signal from detector 17, the greater bias is increased in a positive sense on the grid of amplifier 24. Thus, in response to lower amplitude received signals, application of a more negative bias will serve to displace the signal applied to the grid of amplifier 24 further down the characteristic 25, whereby less amplification is obtained, and, accordingly, whereby smaller potentials are supplied to resistance distributor 19 for the cusp-shaped portions of the wave. Conversely, the larger the detected signal magnitude, the more bias is increased in a positive sense with a resultant increase in the magnitude of deflecting potentials applied to deflection systems 20 and 21 for each cusp-shaped portion of the received and detected signal, as will be clear. The effect of a received signal decreasing in magnitude is illustrated in dotted lines in Fig. 4, wherein the dot-dash line 28 represents the respective limits of the cusp-shaped portions, as the signal gets weaker and the gain of amplifier 24 decreases.

It is apparent that I have just described a device for indicating the resultant vectors $R_1$ and $R_2$ graphically on the screen of the cathode ray device as they appear alternately during flight. If the wave-length of the detected signal is extremely or relatively short, it is clear that oscillation between these two resultants will be relatively rapid and may even be so rapid that indications 10 or 11 of both resultants $R_1$ and $R_2$ may appear simultaneously on the screen of the cathode ray indicator, due to persistence of vision. In such case, it might perhaps be sufficient for the pilot to get a rough idea of true direction merely by imagining the above-noted median. However, for greater accuracy, it is considered preferable to include a simple calculating device either superposed over the screen of the cathode ray indicator or elsewhere on the instrument panel of the airplane.

A possible calculating device is shown in Fig. 5. This device comprises a pair of arms 29 and 30 pivotally related to each other at one end 31. Each arm 29, 30 is provided with an adjustably slidable clamping device 32, 32 which may either frictionally engage the arm over which it slides or be fixed in a steady position therealong by means of a set screw or wing nut, for example. In the form shown, each arm carries one end of a pantograph device 33 so that independent adjustment of arms 29, 30, or clamps 32, 32' along these arms, may be permitted. A pin at the midpoint of the pantograph 33 preferably slidingly engages an indicating-needle arm 34, freely pivotable about the point 31 as a center.

In order to obtain a true direction reading with the device shown in Fig. 5, all that need be done is to adjust the spread between arms 29 and 30 to equal the observed angular oscillation between resultant vectors $R_1$ and $R_2$, and then slide clamps 32 and 32' radially outward above arms 29 and 30, an amount proportional to the respective magnitudes of the vectors $R_1$ and $R_2$. Needle 34 will then automatically assume an inclination indicative of the desired true direction with respect to the observed critical resultants $R_1$ and $R_2$, as will be clear. If the device of Fig. 5 be provided in superposed relation over the screen of the cathode ray device 22, and point 31 be made to coincide with the center thereof, arms 29 and 30 may very easily be swung into the respective angular dispositions of critical resultants 10 and 11, and clamps 32 and 32' may be so adjusted that the ends of the pantograph 33 coincide with the ends of the configurations 10 and 11. It is suggested that, in such an embodiment, the ends of pantograph 33 be supported on some sort of hollow pin arrangement 35, 35' so that they may be accurately centered over the respective ends of indications 10 and 11, with relative ease, as will be clear.

Although I have described the invention particularly in connection with the cathode ray indicating system of Fig. 2, it is clear that many other known systems may be employed. For example, a manually rotatable loop antenna may be swung to determine the first position of maximum sharp reception (that is, substantially zero signal) corresponding to detection of one of the resultants $R_1$ or $R_2$. Immediately, then the loop could be swung 90° to pick up maximum signal, and an ammeter device may be observed at that instant so that data for constructing one of the vectors $R_1$ and $R_2$ may be obtained. The loop would then be used to follow the oscillation of direction readings until the other resultant (e. g., substantially zero signal) is detected, at which time the ammeter would again be observed in the above-indicated manner. There would then be sufficient data for either graphically plotting the diagram of Fig. 1 or for setting an instrument of the nature shown in Fig. 5, whereby true direction is immediately known.

It is equally clear that in the case of the known type of continuously rotating antenna direction finders all that would be needed in addition in order to perform the method of the invention would be to provide a smoothing network as shown in Fig. 2, with a metering device to indicate average signal strength. There would thus again be sufficient data for either graphically plotting the diagram of Fig. 1 or for setting an instrument of the nature shown in Fig. 5, as will be understood.

Although I have described my invention in connection with the determination of true direction in the presence of night and mountain error, it is clear that the above teachings are equally useful in determining the respective directions of two or more broadcasting stations transmitting synchronously. This sort of transmission is frequent in war time as a protective measure to avoid enemy aircraft using the broadcasting station for direction finding or homing. It is clear that with the method and means above described, it would be possible to overcome interference effects of the synchronously broadcast signals and thus to home or take a bearing on any one of the transmitters.

When ultra short waves are employed for transmitting direction-finding signals, it is clear that the method and means in accordance with the invention have further utility in eliminating confusing effects due to reflection from such large reflecting objects as hangars, parts of ships, etc. and make it possible for true bearings to be obtained in spite of such otherwise confusing effects.

Although I have described my invention in considerable detail in connection with the preferred forms shown, it is clear that many additions, omissions and modifications may be made fully within the scope thereof.

What I claim is:

1. The method of direction finding in the presence of similar signals apparently emanating from different directions which comprises obtaining an indication of vectors defining the magnitude and direction of each apparent directional signal present under such conditions, and deriving a median of the triangle formed by said vectors and a line joining their extremes, said median extending through the midpoint of said line.

2. The method of direction finding in the presence of similar signals apparently emanating from different directions which comprises proceeding in a fixed direction, observing directional bearings until a relatively sharp one is obtained, noting the magnitude of signal received for said sharp bearing, whereby one vector is defined, proceeding further in said direction until a succeeding sharp bearing is observed, noting the magnitude of signal received for said succeeding sharp bearing, whereby a second vector is defined, and deriving an indication of the direction of a median of the triangle formed by said vectors and a line joining their extremes, said median extending through the midpoint of said line.

3. The method according to claim 2, wherein said similar signals are a directly propagated wave and a reflection thereof.

4. The method according to claim 2, wherein said similar signals are a directly propagated wave and a reflection thereof from an ionosphere layer.

5. Direction indicating apparatus comprising directional antenna means including means for effectively rotating directional response thereof, detector means coupled to said antenna means, cathode ray tube indicator means including deflection means coupled to said detector means, means responsive to said detector means for deriving a signal proportional to the average magnitude of output from said detector means, means coupling said detection means to said deflection means, and a viewing screen and adjustable means for determining a true direction indication forming a part of said cathode ray indicator means, said adjustable means including two arms pivotally related about substantially the center of said screen, adjustably slideable means on each said arm, and expansible means carried by and extending between each said last-mentioned means, said expansible means including means continually indicating the midpoint of said expansible means.

6. Direction indicating apparatus comprising directional antenna means including means for effectively rotating directional response thereof, detector means coupled to said antenna means, indicator means coupled to said detector means, means responsive to said detector means for deriving a signal proportional to the average magnitude of output from said detector means, means coupling said detector means to said indicator means, said indicator means comprising means for indicating the instantaneous effective directional response of said antenna means and the relative strength of said proportional signal, and adjustable means for determining a true direction indication, said adjustable means including two pivotally related arms, adjustably slidable means on each said arm, and expansible means provided with means for continually indicating the midpoint thereof carried by and extending between each of said pivotal arms.

HENRI G. BUSIGNIES.

REFERENCES CITED

The following references are of record in the file of this patent:

UNITED STATES PATENTS

| Number | Name | Date |
|---|---|---|
| 2,172,536 | Hefele | Sept. 12, 1939 |
| 2,263,377 | Busignies et al. | Nov. 18, 1941 |
| 2,277,905 | Eaton | Mar. 31, 1942 |